(12) United States Patent
Spain et al.

(10) Patent No.: US 12,510,286 B2
(45) Date of Patent: Dec. 30, 2025

(54) DISPOSABLE ICE PACK

(71) Applicant: The Board of Trustees of Western Michigan University, Kalamazoo, MI (US)

(72) Inventors: Brian Spain, Fort Mill, SC (US); Paul Kenyon, Fort Mill, SC (US); Murray Ross, Fort Mill, SC (US)

(*) Notice: Subject to any disclaimer, the term of this patent is extended or adjusted under 35 U.S.C. 154(b) by 0 days.

(21) Appl. No.: 17/899,115

(22) Filed: Aug. 30, 2022

(65) Prior Publication Data

US 2022/0412634 A1    Dec. 29, 2022

Related U.S. Application Data

(62) Division of application No. 16/478,437, filed as application No. PCT/US2018/013800 on Jan. 16, 2018, now Pat. No. 11,454,439.

(Continued)

(51) Int. Cl.
*F25D 3/08*      (2006.01)
*B32B 3/26*      (2006.01)
(Continued)

(52) U.S. Cl.
CPC ............. *F25D 3/08* (2013.01); *B32B 3/266* (2013.01); *B32B 7/12* (2013.01); *B32B 29/002* (2013.01);
(Continued)

(58) Field of Classification Search
CPC ... F25D 3/08; F25D 2303/0822; B32B 3/266; B32B 7/12; B32B 29/002; B32B 29/005; B32B 37/0076; B32B 37/30; B32B 2038/047; B32B 2250/26; B32B 2255/12; B32B 2307/546; B32B 2307/718; B32B 2307/726; B32B 2317/12; B32B 2398/00; B32B 2250/02; B32B 2255/205;
(Continued)

(56) References Cited

U.S. PATENT DOCUMENTS 2,154,933 A    4/1939  Hadsell
2,619,801 A    12/1952 Evans
(Continued)

FOREIGN PATENT DOCUMENTS

CN    101952511    1/2011
EP    1997460      12/2008
(Continued)

OTHER PUBLICATIONS

Greener Package, Enviro-Ice Gel Pack with Biodegradable Film, Accessed Online at https://www.greenerpackage.com/compost biodegrade/enviro-ice_gel_pack_biodegradable_film.
(Continued)

*Primary Examiner* — Christopher W Raimund

(57) ABSTRACT

This disclosure includes ice packs that comprise paper and absorbent material, and also includes various methods of making, adding liquid to, freezing, shipping, and/or using such ice packs. This disclosure also includes assemblies that include one or more such ice packs, such as, for example, a container of a plurality of such ice packs in dry, wet, and/or frozen states, or a container that includes an ice pack in a hydrated, frozen state and one or more perishable items.

19 Claims, 5 Drawing Sheets

Related U.S. Application Data

(60) Provisional application No. 62/446,815, filed on Jan. 16, 2017.

(51) Int. Cl.
 *B32B 7/12* (2006.01)
 *B32B 29/00* (2006.01)
 *B32B 37/00* (2006.01)
 *B32B 37/30* (2006.01)
 *B32B 38/04* (2006.01)

(52) U.S. Cl.
 CPC ........ *B32B 29/005* (2013.01); *B32B 37/0076* (2013.01); *B32B 37/30* (2013.01); *B32B 2038/047* (2013.01); *B32B 2250/26* (2013.01); *B32B 2255/12* (2013.01); *B32B 2307/546* (2013.01); *B32B 2307/718* (2013.01); *B32B 2307/726* (2013.01); *B32B 2317/12* (2013.01); *B32B 2398/00* (2013.01); *F25D 2303/0822* (2013.01)

(58) Field of Classification Search
 CPC ............ B32B 2255/24; B32B 2255/26; B32B 2307/7265; B32B 2307/732; B32B 2555/02; B32B 3/08; B32B 27/00
 See application file for complete search history.

(56) References Cited

U.S. PATENT DOCUMENTS

| | | | |
|---|---|---|---|
| 3,325,082 A | 6/1967 | Naylor | |
| 3,867,939 A | 2/1975 | Moore et al. | |
| 3,871,376 A | 3/1975 | Kozak | |
| 4,462,224 A | 7/1984 | Dunshee et al. | |
| 4,606,958 A | 8/1986 | Haq et al. | |
| 4,908,248 A | 3/1990 | Nakashima et al. | |
| 5,031,418 A | 7/1991 | Hirayama et al. | |
| 5,150,707 A | 9/1992 | Anderson | |
| 5,619,841 A | 4/1997 | Muise et al. | |
| 5,628,845 A | 5/1997 | Murray et al. | |
| 5,697,961 A | 12/1997 | Kiamil | |
| 5,709,089 A * | 1/1998 | Dawson | F25D 3/02 |
| | | | 62/4 |
| 5,785,696 A * | 7/1998 | Inoue | A61F 13/53717 |
| | | | 604/378 |
| 5,785,980 A | 7/1998 | Mathewson | |
| 6,068,585 A | 5/2000 | Ouchi | |
| 6,083,580 A | 7/2000 | Finestone et al. | |
| 6,132,454 A | 10/2000 | Fellows | |
| 6,269,654 B1 | 8/2001 | Murray et al. | |
| 6,786,880 B2 | 9/2004 | Wall | |
| 8,240,300 B1 | 8/2012 | Wilhelm | |
| 8,366,759 B2 | 2/2013 | Dunshee et al. | |
| 2001/0018605 A1 * | 8/2001 | Helming | A61F 7/03 |
| | | | 607/108 |
| 2005/0074614 A1 | 4/2005 | Jonas et al. | |
| 2006/0069367 A1 | 3/2006 | Waksmundzki et al. | |
| 2006/0081000 A1 | 4/2006 | Trinh et al. | |
| 2007/0157657 A1 | 7/2007 | Fogerty | |
| 2007/0286928 A1 | 12/2007 | Sarmas et al. | |
| 2008/0039810 A1 | 2/2008 | Lee et al. | |
| 2008/0119916 A1 | 5/2008 | Choucair et al. | |
| 2011/0126582 A1 | 6/2011 | Duong et al. | |
| 2011/0132975 A1 | 6/2011 | Toft et al. | |
| 2011/0208146 A1 | 8/2011 | Michnacs et al. | |
| 2012/0190259 A1 | 7/2012 | Frost | |
| 2013/0073019 A1 | 3/2013 | Zhong | |
| 2013/0182975 A1 | 7/2013 | Ochoa Marin | |
| 2013/0264517 A1 | 10/2013 | Matsumoto et al. | |
| 2014/0041818 A1 * | 2/2014 | Sealey | D21H 15/04 |
| | | | 162/13 |
| 2014/0230484 A1 | 8/2014 | Yavitz | |
| 2016/0187047 A1 | 6/2016 | Duong | |
| 2016/0348318 A1 * | 12/2016 | Koenig | D21H 19/54 |

FOREIGN PATENT DOCUMENTS

| | | | |
|---|---|---|---|
| JP | S63/140273 | 6/1988 | |
| JP | H 0515931 | 3/1993 | |
| JP | H065574 Y2 * | 2/1994 | |
| JP | H 06171675 | 6/1994 | |
| JP | 2009/072404 | 4/2009 | |
| JP | 2010/240193 | 10/2010 | |
| JP | 2010240193 A * | 10/2010 | |
| TW | 201708660 | 1/2017 | |
| WO | WO-9824974 A1 * | 6/1998 | D21H 21/20 |
| WO | 2009112255 | 3/2009 | |
| WO | WO 2013/044933 | 4/2013 | |
| WO | WO 2016/187435 | 11/2016 | |
| WO | WO 2017/083738 | 5/2017 | |
| WO | WO 2017/133801 | 8/2017 | |
| WO | WO 2018/132812 | 7/2018 | |

OTHER PUBLICATIONS http://coldchain.polar-tech.com/viewitems/all-categories-food-cold-packs-ice-brix-gel-packs/d-packs-ice-brix-ice-packs-biodegradable-gel-packs (captured by Internet Archive Dec. 17, 2016).
International Search Report and Written Opinion Issued in Corresponding PCT Application No. PCT/US2019/037926, mailed Sep. 16, 2019.
International Search Report and Written Opinion Issued in Corresponding PCT Application No. PCT/US2018/013800, mailed Jun. 13, 2018.
Screen capture from YouTube video clip entitled "Insta-Zorb™ Demonstration: Super. Absorbent Powder Absorbs 700x Its Weight," Momar, Inc., Published Jun. 16, 2009, Captured Jan. 29, 2020, Retrieved from the Internet: https://www.youtube.com/watch?v=QGKbSCokPW0&feature=youtu.be&t=3.
Screen capture from YouTube video clip entitled "ThermaFreeze Ice Wraps™", Published Jul. 30, 2013, Captured Feb. 7, 2020, Retrieved from the Internet, https://www.youtube.com/watch?v=cTE-s941d &M.
Shop—Cold Packs—Dry Gel Ice Packs—TSK Supply. (2020). Retrieved Feb. 7, 2020, from http://www.tsksupply.com/dry-gel-ice-packs/.
Techni Ice Review—Reusable Portable Ice of Heat Pack For Fishing Coolers Dry Ice Cold Ice. (2020). Retrieved Feb. 7, 2020 from the Internet Accessed Online at.
International Search Report in related PCT Application No. PCT/US2018/013800, mailed Jun. 13, 2018.
Search Report in EP 3811006 [Oct. 6, 2022].

\* cited by examiner

DISPOSABLE ICE PACK

CROSS-REFERENCE TO RELATED APPLICATIONS

This application is a divisional of, and claims priority under 35 U.S.C. § 120 to, U.S. patent application Ser. No. 16/478,437, filed Jul. 16, 2019, which is a U.S. National Phase Application under 35 U.S.C. § 371 of International Application No. PCT/US2018/013800, filed Jan. 16, 2018, which claims priority to U.S. Provisional Patent Application No. 62/446,815 filed Jan. 16, 2017. The entire contents of each of the referenced applications are fully incorporated herein by reference in their entirety.

FIELD OF INVENTION

The present invention relates generally to ice packs, such as may be used to keep cold perishable items; and more particularly, but not by way of limitation, ice packs that comprise paper and absorbent material, and various assemblies and methods related to such ice packs.

BACKGROUND

Ice packs—which may also be referred to in the art as freezer ice packs, cold packers, freezer packs, and/or the like—are often used to keep perishable and/or temperature-sensitive items like food cold during shipping and/or storage. Such prior art ice packs typically include a plastic container, such as a bag or bottle, containing liquid or gel that can be frozen. Because such prior art ice packs typically include plastic and/or freezable gels with chemicals, they may not be environmentally friendly and/or may be relatively expensive.

SUMMARY

This disclosure includes embodiments of: ice packs comprising paper; chains or strings of ice packs from which ice packs may be separated, for example, one at a time or two at a time; assemblies including multiple ice packs in a dry, wet, and/or froze state, assemblies including an ice pack and a perishable or otherwise temperature-sensitive item; and methods of making ice packs, adding water or other liquid to ice packs, freezing ice packs, shipping ice packs, and/or otherwise using ice packs. The use of paper in the present ice packs can make them more environmentally friendly than prior art plastic ice packs. Additionally, the present ice packs can be manufactured to have an opening through which water can be introduced as a thermal medium into the ice pack, thereby reducing initial weight and shipping costs to a point of use by allowing the water to be added at the point of use.

Some embodiments of the present apparatuses comprise: a body comprising paper that defines an interior chamber, the paper configured to resist degradation when exposed to water; and an absorbent material disposed in the interior chamber; where the body defines an opening in communication with the interior chamber, the opening configured to receive liquid into the interior chamber and to be closed after the liquid is received in the interior chamber. For example, the body can be substantially rectangular.

In some embodiments of the present apparatuses, the paper is configured to resist passage of liquid through the paper. In some embodiments, the paper includes sizing that increases hydrophobic properties of the paper and/or increases resistance to passage of liquid through the paper.

In some embodiments of the present apparatuses, the paper has dry tensile strength measured according to Test Standard ASTM D828-16 and a wet tensile strength measured according to Test Standard ASTM D829-97 that is 20% or more of the dry tensile strength. In some such embodiments, the wet tensile strength that is 30% or more of the dry tensile strength.

In some embodiments of the present apparatuses, the paper has a basis weight of 20 grams per square meter (gsm) or greater. In some such embodiments, the paper has a basis weight of 40 gsm or greater.

In some embodiments of the present apparatuses, the body comprises: a first layer of paper having a first perimeter; and a second layer of paper having a second perimeter; where the first layer is bonded to the second layer along a majority of each of the first and second perimeters. In some such embodiments, the first layer is unitary with the second layer and part of the bonded portions of the first and second perimeters is defined by a fold. In some embodiments, the first layer is bonded to the second layer via an adhesive.

In some embodiments of the present apparatuses, the absorbent material comprises super absorbent polymer (SAP) and/or fluff pulp. In some embodiments, the absorbent material comprises SAP and fluff pulp. In some embodiments, the SAP comprises 30 percent by weight or less of the absorbent material, and the fluff pulp comprises 70 percent or more by weight of the absorbent material. In some embodiments, the absorbent material is coupled to a substrate; for example, in some such embodiments, the substrate encapsulates the absorbent material and, in other embodiments, the absorbent material comprises adhesive and is formed into a loaf that is coupled to the substrate.

In some embodiments of the present apparatuses, the opening is defined by a portion of the first and second perimeters along which the first layer is not bonded to the second layer.

Some embodiments of the present apparatuses further comprise: a pressure-sensitive adhesive disposed on an exterior surface of the first layer or the second layer; and a liner disposed over the pressure-sensitive adhesive; where the opening is disposed at a top end of the body and the pressure-sensitive adhesive is positioned closer to the top end than to a bottom end of the body.

Some embodiments of the present apparatuses further comprise: a port coupled to the body and configured to permit the liquid to be introduced into the interior chamber. In some such embodiments, the port comprises a one-way valve configured to close the opening after water is received in the interior chamber. In some embodiments, the opening is defined by and through one of the first and second layers.

Some embodiments of the present assemblies comprise: a container; and a plurality of the present apparatuses disposed in the container. In some such embodiments, the apparatuses are substantially dry. In other embodiments, the liquid is disposed in the absorbent material of each of the apparatuses and, if the liquid in the apparatuses is frozen, the assembly may further comprise one or more perishable or otherwise temperature-sensitive items disposed in the container.

Some embodiments of the present methods comprise: providing an embodiment of the present apparatuses; introducing liquid through the opening into the interior volume; and freezing the liquid. Some such embodiments further comprise: closing the opening prior to freezing the liquid.

Some embodiments of the present apparatuses include a plurality of ice packs and, in some instances, are similar to the apparatuses described above in some or all of the described features. For example, some such embodiments comprise: a body comprising paper that defines an interior chamber, the paper configured to resist degradation when exposed to water; and two distinct portions of absorbent material disposed in the interior chamber and spaced apart from each other; where the body is configured to be divided into two sub-bodies each defining a respective interior chamber and an opening in communication with the interior chamber, the opening configured to receive liquid into the interior chamber and to be closed after the liquid is received in the interior chamber. In some such embodiments, the body is perforated along a line disposed between the two portions of absorbent material. In some such embodiments, the body defines a plurality of interior chambers and includes more than two distinct portions of absorbent material.

Some embodiments of the present methods comprise: disposing distinct portions of absorbent material along a length of a first layer of paper that is configured to resist degradation when exposed to water; bonding a second layer of paper to the first layer of paper such that the first and second layers define a plurality of interior chambers each including one or more of the distinct portions of the absorbent material, the second layer of paper configured to resist degradation when exposed to water. In some embodiments, the second layer is bonded to the first layer along longitudinal edges of the first and second layers. In some embodiments, the second layer is bonded to the first layer along a plurality of lines extending laterally between the longitudinal edges and disposed between every other pair of the distinct portions of absorbent material such that each interior chamber includes two of the distinct portions of absorbent material. In some such embodiments, the method further comprises: perforating the first and second layers along a plurality of lines extending laterally between the longitudinal edges and disposed between the two of the distinct portions of absorbent material in each of the interior chambers. In other embodiments, the second layer is bonded to the first layer along a plurality of longitudinal lines extending laterally between the longitudinal edges and disposed between each two distinct portions of absorbent material such that one of the distinct portions of absorbent material is disposed in each interior chamber.

The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the term "substantially" may be substituted with "within [a percentage] of what is specified, where the percentage includes 0.1, 1, 5, and 10 percent.

The terms "comprise" and any form thereof such as "comprises" and "comprising," "have" and any form thereof such as "has" and "having," and "include" and any form thereof such as "includes" and "including" are open-ended linking verbs. As a result, an apparatus that "comprises," "has," or "includes" one or more elements possesses those one or more elements, but is not limited to possessing only those elements. Likewise, a method that "comprises," "has," or "includes" one or more steps possesses those one or more steps, but is not limited to possessing only those one or more steps.

Any embodiment of any of the apparatuses, systems, and methods can consist of or consist essentially of—rather than comprise/include/have—any of the described steps, elements, and/or features. Thus, in any of the claims, the term "consisting of or "consisting essentially of can be substituted for any of the open-ended linking verbs recited above, in order to change the scope of a given claim from what it would otherwise be using the open-ended linking verb.

Further, a device or system that is configured in a certain way is configured in at least that way, but it can also be configured in other ways than those specifically described.

The feature or features of one embodiment may be applied to other embodiments, even though not described or illustrated, unless expressly prohibited by this disclosure or the nature of the embodiments.

Some details associated with the embodiments described above and others are described below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. Views in the figures are drawn to scale, unless otherwise noted, meaning the sizes of the depicted elements are accurate relative to each other for at least the embodiment in the view.

DETAILED DESCRIPTION OF ILLUSTRATIVE EMBODIMENTS

Figure 1:
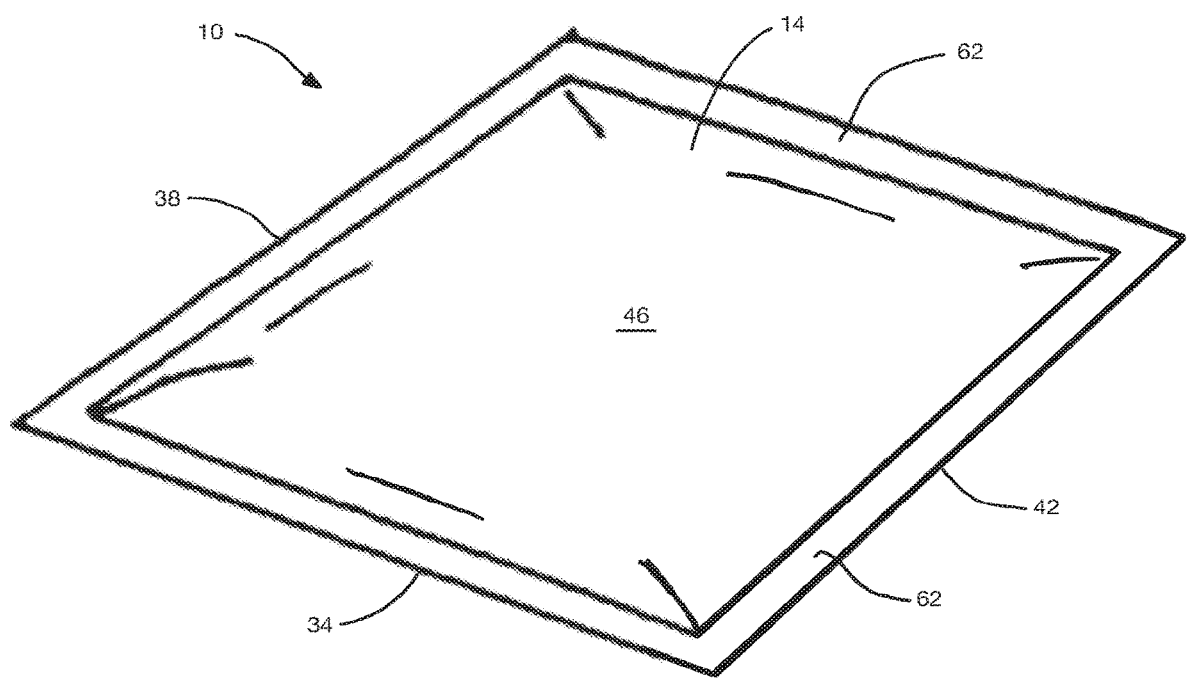
FIG. 1 depicts an upper perspective view of an embodiment of the present ice packs.
Figure 2:
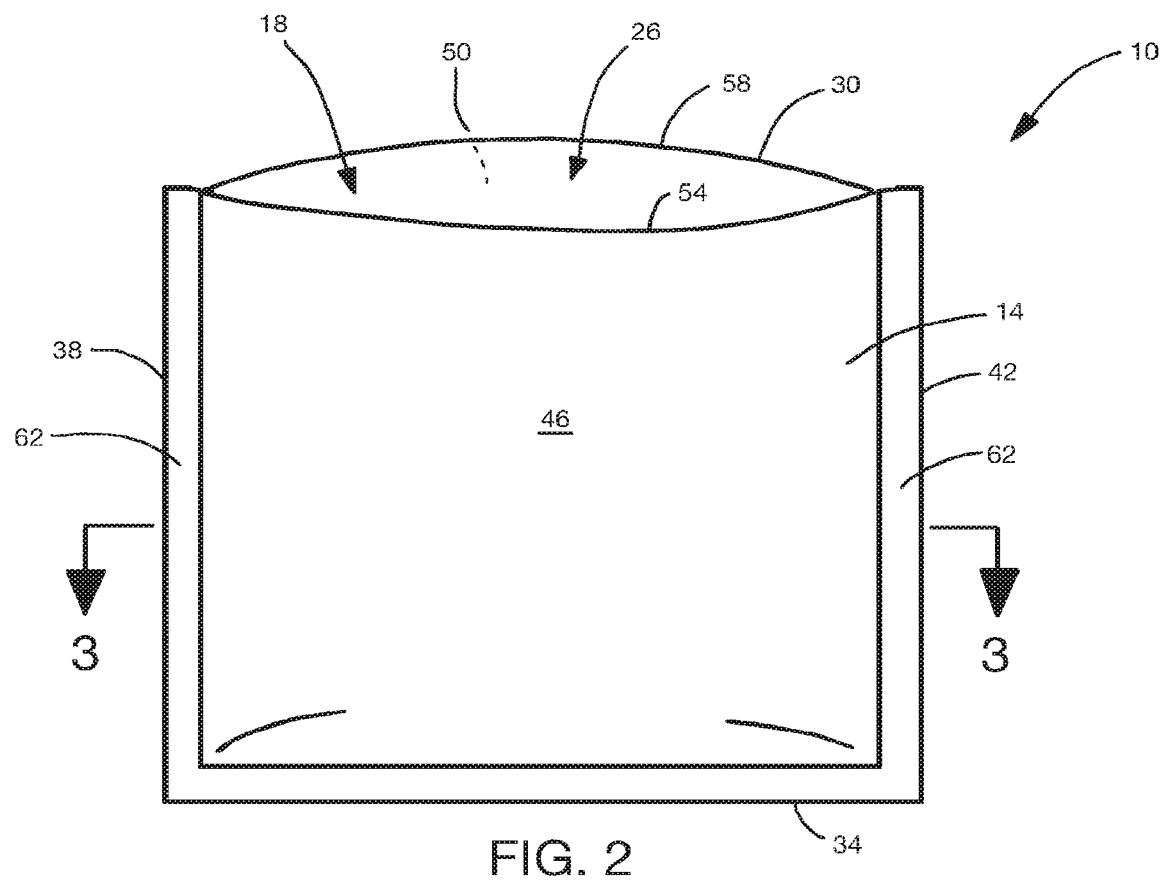
FIG. 2 depicts a front view of the ice pack of FIG. 1 in an open state in which liquid can be added to its interior before being closed.
Figure 3:
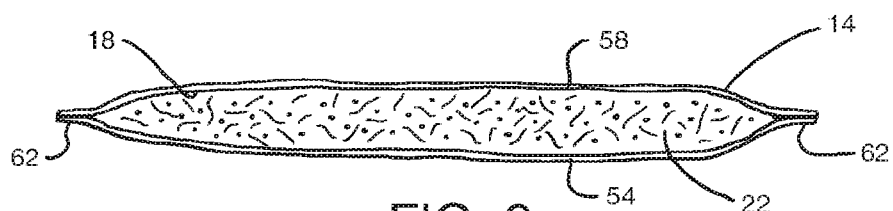
FIG. 3 depicts cross-sectional view of the ice pack of FIG. 2 taken along the line 3-3 of FIG. 2.

Referring now to the drawings, and more particularly to FIGS. 1-3, an embodiment 10 is shown of the present apparatuses or ice packs. FIG. 1 depicts an upper perspective view of the ice pack in a closed state; FIG. 2 depicts a front view of the ice pack in an open state; and FIG. 3 depicts cross-sectional view of the ice pack taken along the line 3-3 of FIG. 2.

In the embodiment shown in FIGS. 1-3, ice pack 10 includes a body 14 comprising paper that defines an interior chamber 18, and an absorbent material 22 disposed in the chamber. As shown in FIG. 2, body 14 in its open state defines an opening 26 in communication with interior chamber 22 that is configured to receive liquid into the interior chamber such that the liquid can be absorbed by and into the absorbent material. Opening 26 is further configured to be closed after the liquid is received in interior chamber 22.

In the embodiment shown in FIGS. 1-3, body 14 has a top end 30, a bottom end 34, a left side 38, a right side 42, a front side 46, and a back side 50. "Top," "bottom," "left," "right," "front," and "back" are used for reference in the depicted orientations and do not suggest any required orientation of the present ice packs. In this embodiment, body 14 comprises a first layer 54 having a first perimeter; and a second layer 58 of paper having a second perimeter. First layer 54 is bonded to second layer 58 along a majority of each of the first and second perimeters, as indicated by region 62. First layer 54 may be bonded to second layer 58, for example, by adhesive, heat, and/or pressure. As another example, first layer 54 and second layer 58 may be folded inward one or more times over the area of region 62, and the layers stapled to retain them in the folded configuration. By way of further example, in other embodiments, first layer 54 may be unitary with second layer 58 and part of the bonded portions of the first and second perimeters, for example, bottom end 34 is defined by a fold.

As noted above, body 14 and, specifically, each of layers 54, 58 comprises paper. Paper is typically not considered suitable for holding water. The present embodiments, however, can utilize paper that is configured to resist degradation when exposed to water. For example, the paper can be treated to increase—e.g., include sizing that increases—hydrophobic properties of the paper. Such increased hydrophobic properties may, for example, increase the amount of time needed for water to saturate and thereby weaken the paper.

Additionally or alternatively, the paper can be configured to have a relatively high wet tensile strength, such as, for example, a wet tensile strength measured according to Test Standard ASTM D829-97—that is 20%, 30%, or more of the paper's dry tensile strength measured according to Test Standard ASTM D828-16. Wet tensile strength can be increased, for example, by increasing hydrophobic properties, as noted above, and/or by increasing the weight of the paper. Some of the present embodiments can include paper having basis weight greater than any one, or between any two, of: 20, 30, 40, 50, 60, 70, 80 or more grams per square meter (gsm).

Additionally or alternatively, the paper can be configured to resist passage of water through the paper. For example, the paper can be configured—via selection of fiber size, fiber type, fiber mixture, thickness, manufacturing process, and/or the like, as known in the paper-making art—to have porosity and/or pore sizes that are small enough to resist the passage of water through the paper. By way of further example, additionally or alternatively, the paper can be treated to increase—e.g., include sizing that increases—resistance to the passage of water through the paper, such as by further decreasing porosity and/or pore size, and/or by increasing hydrophobic properties of the paper. In some embodiments, the paper is liquid impermeable for at least a period of time, such as a period of time that is sufficient to freeze a volume of water with which a given ice pack is configured to be filled. "Liquid impermeable," when used in describing a layer of paper or a laminate of multiple layers of paper, means that a liquid, such as water, will not pass through the layer or laminate, under ordinary use conditions, in a direction generally perpendicular to the plane of the layer or laminate at the point of liquid contact. By way of example, the paper may be configured to be liquid impermeable for a period greater than any one, or between any two, of: 5, 10, 20, 30, 60, 120, 180, 240, 300, or more minutes.

The inclusion of absorbent material 22 reduces the need for the paper of body 14 to be entirely liquid impermeable because the absorbent material absorbs liquid inserted into interior chamber 18 and thereby reduces the outward fluid pressure that might otherwise be exerted on the paper and, in turn, reduces or prevents leakage of undesirable or even perceptible amounts of liquid through the paper. In the embodiment shown in FIGS. 1-3, absorbent material 22 comprises super absorbent polymer (SAP) and cellulosic fibers such as fluff pulp. "Superabsorbent" or "superabsorbent material" or "SAP" refers to a water-swellable, water-insoluble organic or inorganic material capable, under the most favorable conditions, of absorbing at least about 15 times its weight in an aqueous solution containing 0.9 weight percent sodium chloride and, more desirably, at least about 30 times its weight in an aqueous solution containing 0.9 weight percent sodium chloride and, even more desirably, at least about 50 times its weight in an aqueous solution containing 0.9 weight percent sodium chloride. The SAP materials can be natural, synthetic and modified natural polymers and materials. In addition, the SAP materials can be inorganic materials, such as silica gels, or organic compounds such as cross linked polymers.

In embodiments in which the cellulosic fibers of the absorbent material 22 comprise fluff pulp, the fluff pulp can comprise, for example, southern softwood fluff pulp. In some embodiments, the SAP comprises 30 percent by weight or less of the absorbent material, and the fluff pulp comprises 70 percent or more by weight of the absorbent material. For example, in some particular embodiments, the SAP comprises 20 percent by weight of the absorbent material, and the fluff pulp comprises 80 percent by weight of the absorbent material. SAPs that are suitable for at least some embodiments of the present ice packs are available from Sumitomo Seika Europe S.A./N.V. in Belgium and/or from NA Industries, Inc. in Houston, Texas, USA. For example, in some embodiments, the SAP can have a retention capacity of 20-60 grams per gram (g/g), for example 35-60 g/g, when measured with Test Standard WSP 241.3, and/or a particle size distribution (PSD) with most or substantially all particles having a size between 150 µm and 850 µm.

In use of the embodiment shown in FIGS. 1-3, a volume water is introduced into interior chamber 18 and at least some, and in some instances substantially all, of the water is absorbed by absorbent material 22. The temperature of the ice pack can then be lowered, for example in a freezer, to freeze the liquid. Prior to or after freezing the liquid, opening 26 can be closed to fully enclose absorbent material 22 and the liquid in interior chamber 18. For example, top end 30 of layers 54, 58 can be folded over one or more times toward, and taped, stapled, or otherwise fixed relative to, front side 46 or back side 50 of body 14. In other embodiments, layers 54 and 58 can be taped or glued together at top end 30 without folding.

Figure 4:
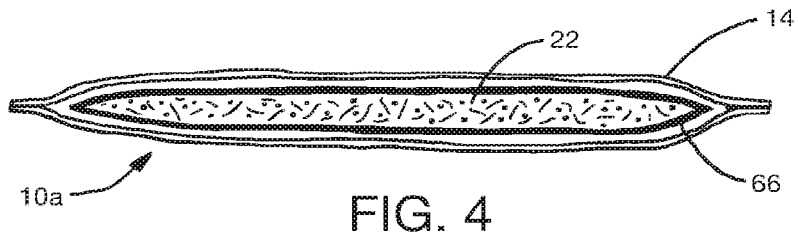
FIG. 4 depicts a cross-sectional view of a second embodiment of the present ice packs.

FIG. 4 depicts a cross-sectional view of a second embodiment 10a of the present ice packs. Ice pack 10a is substantially similar to ice pack 10 with one primary difference. Specifically, while ice pack 10 has absorbent material 22 placed directly in paper 14—i.e., as loose fill within interior chamber 18—in ice pack 10a, absorbent material 22 is encapsulated in a substrate 66. By way of example, substrate 66 can comprise a tissue or other liquid-permeable material that contains absorbent material 22, such as to facilitate manufacturing of the present ice packs.

Figure 5:
FIG. 5 depicts a cross-sectional view of a third embodiment of the present ice packs.

FIG. 5 depicts a cross-sectional view of a third embodiment 10b of the present ice packs. Ice pack 10b is substantially similar to ice pack 10a with one primary difference. Specifically, while ice pack 10a has absorbent material 22 encapsulated by a substrate 66; in ice pack 10b, absorbent material 22 comprises adhesive and is formed into a loaf that is coupled to substrate 66a. By way of example, in this embodiment, substrate 66a includes a porous material—e.g., tissue or the like—through which a vacuum can be applied to draw the SAP and fluff pulp of the absorbent material onto substrate 66a to facilitate manufacturing. In this embodiment, absorbent material 22 and substrate 66a form a structure that is similar in some respects, and can be manufactured by known methods used for, absorbent cores used in disposable diapers, incontinence pads, and other disposable absorbent articles.

Figure 6:
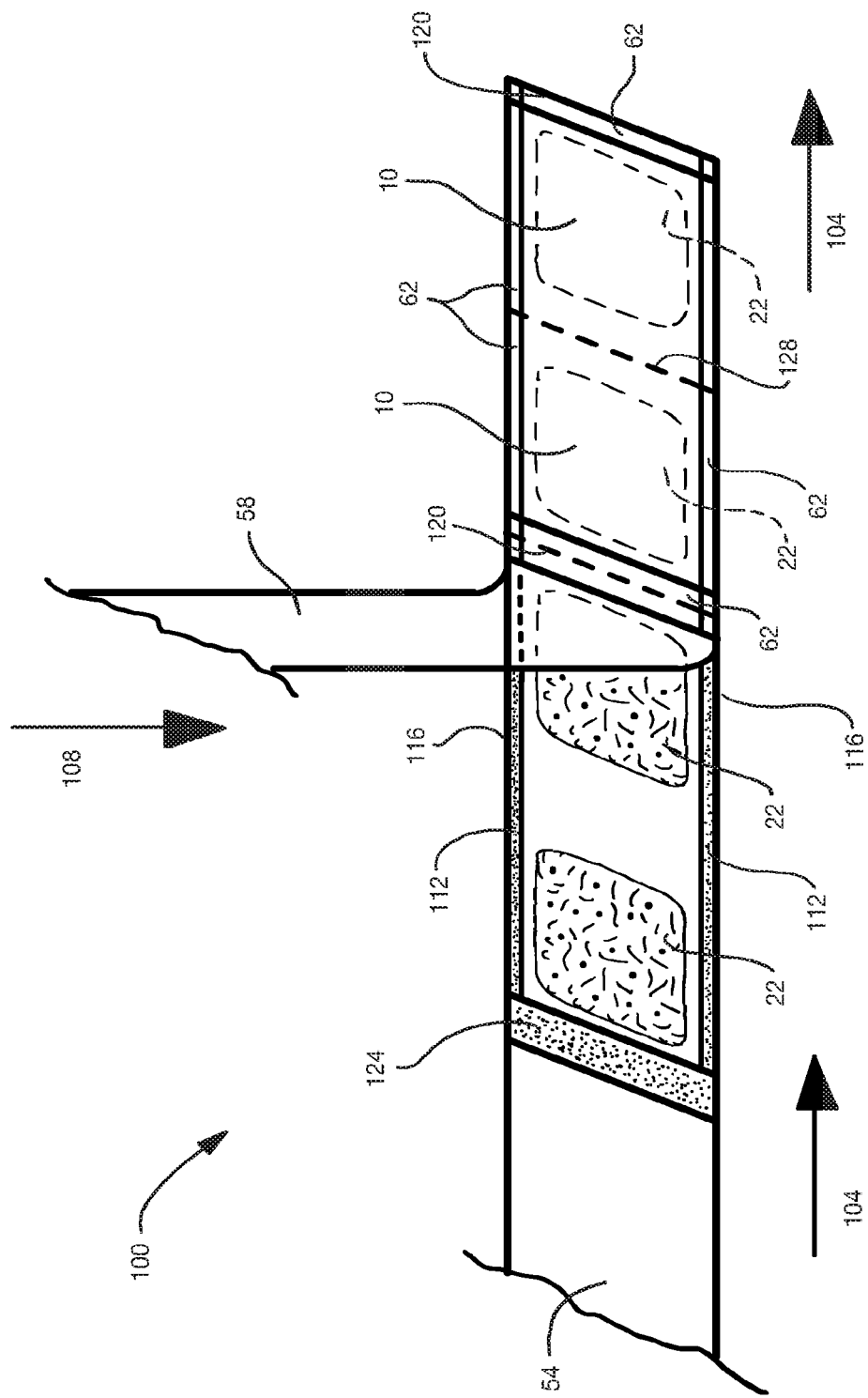
FIG. 6 depicts a perspective view showing aspects of a method of making certain embodiments of the present ice packs.

FIG. 6 depicts a perspective view of certain materials on an assembly line 100 showing aspects of a method of making a plurality of ice packs 10. As shown, a first sheet of paper defining first layer 54 can be conveyed, for example from a roll, in a first machine direction 104, and a second sheet of paper defining second layer can be conveyed, for example in a vertical direction 108, toward first layer 54. Once first layer 54 and second layer 58 are brought together, both can be conveyed together in machine direction 104. While not shown in FIG. 6, it should be understood that conveyors and rollers are used to convey and direct the sheets of paper, for example, at the point at which the second sheet of paper turns from vertical direction 108 to machine direction 104. Such conveyors and rollers, as well as various other pieces of equipment for depositing absorbent material, depositing adhesive and/or otherwise bonding layers, for perforating sheets of material, and/or cutting articles from a string or chain of manufactured articles, are well known in the art of manufacturing of diapers, incontinence pads, and other disposable absorbent articles.

In the manufacturing environment shown in FIG. 6, a plurality of the present ice packs 10 can be manufactured rapidly. Specifically, distinct portions of absorbent material 22 can be disposed, as shown, along a length of a first layer 54 of paper. For example, equipment and process used to form absorbent cores and/or otherwise deposit absorbent materials in the manufacture of diapers, incontinence pads, and other disposable absorbent articles can be used to deposit the distinct portions of absorbent material 22.

As absorbent material 22 is deposited on first layer 54, for example after some distinct portions of the absorbent material are deposited on the first layer, second layer 58 is bonded to first layer 54 such that the first and second layers 54, 58 define a plurality of interior chambers 18 each including one or more of the distinct portions of the absorbent material. For example, in the embodiment shown, adhesive 112 is deposited along longitudinal edges 116 of first layer 54 and/or of second layer 58 to bond first and second layers 54, 58 together along the ones of regions 58 extending in machine direction 62. Adhesive 112 is also deposited in the lateral or cross direction to bond second layer 58 to first layer 54 across their width and thereby define individual interior chambers along the length of the assembly. For example, in the embodiment shown, second layer 58 is bonded to first layer 54 along a plurality of lines 120a extending transversely or laterally between the longitudinal edges and disposed between every other pair of the distinct portions of absorbent material 22 such that each interior chamber includes two of the distinct portions of absorbent material, as shown on the right of the assembly depicted in FIG. 6. Specifically, adhesive 124 is deposited along such transverse lines on first layer 54 and/or second layer 58 such that second layer 58 will bond to first layer 54 as the two layers are brought together. Adhesive 124 is deposited in sufficient width to permit the region 62 corresponding to adhesive 124 to be divided or cut to define individual ice packs, or bodies include two ice packs—from the overall assembly. For example, in the depicted configuration, dividing first and second layers 54, 58 along line 120 will sever a body with two distinct portions of absorbent material that may further be divided to define two ice packs 10.

In the configuration depicted in FIG. 6, in which each chamber includes two portions of absorbent material, the method may also include configuring the assembly to be divided into two individual sub-bodies, corresponding to ice pack 10 of FIG. 1. By way of example, the method may include perforating first and second layers 54, 58 along a plurality of lines 128 extending laterally between longitudinal edges 116 and disposed between the two of the distinct portions of absorbent material 122 in each of the interior chambers. Such perforations allow the layers 54, 58 to keep the two ice packs together and the absorbent material enclosed for distribution, but also permit a user to readily separate the assembly along the line of perforation, for example by tearing by hand and without tools, into two distinct ice packs. In other embodiments, such as those with opening like the one described below in connection with FIG. 8, adhesive 124 is also applied along lines 128 such that only one of the distinct portions of absorbent material 22 is disposed in each interior chamber; in such embodiments, individual ice packs are separated from the assembly by cutting first and second layers 54, 58 along each of lines 120 and 128.

While FIG. 6 depicts an embodiment in which first and second layers 54, 58 are defined by distinct pieces of paper, in other embodiments a single piece of paper is folded along one of longitudinal edges 116 such that the perimeter at that longitudinal edge 116 is defined by a fold along which second layer 58 is unitary—i.e., formed of a single piece of material—with first layer 54. In such embodiments, adhesive may be applied in the remaining regions 62 discussed above in connection with FIG. 6, or adhesive 124 may be applied along lines 120 and 128 but omitted from the second longitudinal edge 116 such that the openings (26) of the plurality of ice packs are defined along the longitudinal edge 116 that does not include a fold.

Figure 7:
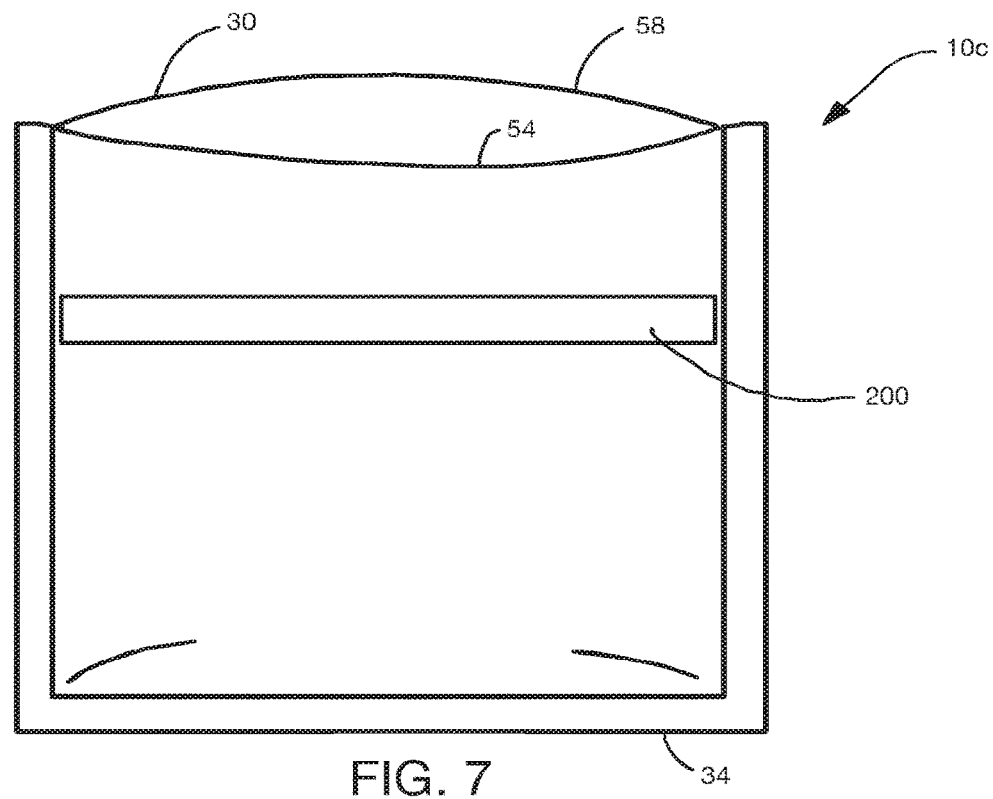
FIG. 7 depicts a front view of a fourth embodiment of the present ice packs with an adhesive region for closing the ice pack after water is added to its interior.

FIG. 7 depicts a front view of a fourth embodiment 10c of the present ice packs. Ice pack 10c is substantially similar to ice pack 10 with one primary difference; namely, that ice pack 10c comprises an adhesive region 200 for closing the ice pack after water is added to its interior chamber 18. More specifically, portions of first and second layers 54, 58 at top end 30 can be folded over, for example two or more times, and pressed or otherwise adhered to adhesive region 200 to retain the folded portions in the folded configuration, thereby closing interior chamber 18. As shown, adhesive region 200 comprises a pressure-sensitive adhesive disposed on and spanning a majority, for example all, of the width of an exterior surface of first layer 54; but may, in other embodiments, be disposed on an exterior surface of second layer 58. During manufacture and/or shipping of ice pack 10c, adhesive region 200 may be covered by a liner to prevent contamination of the adhesive. In this embodiment, adhesive region 200 is disposed closer to top end 30 than to bottom end 34.

Figure 8:
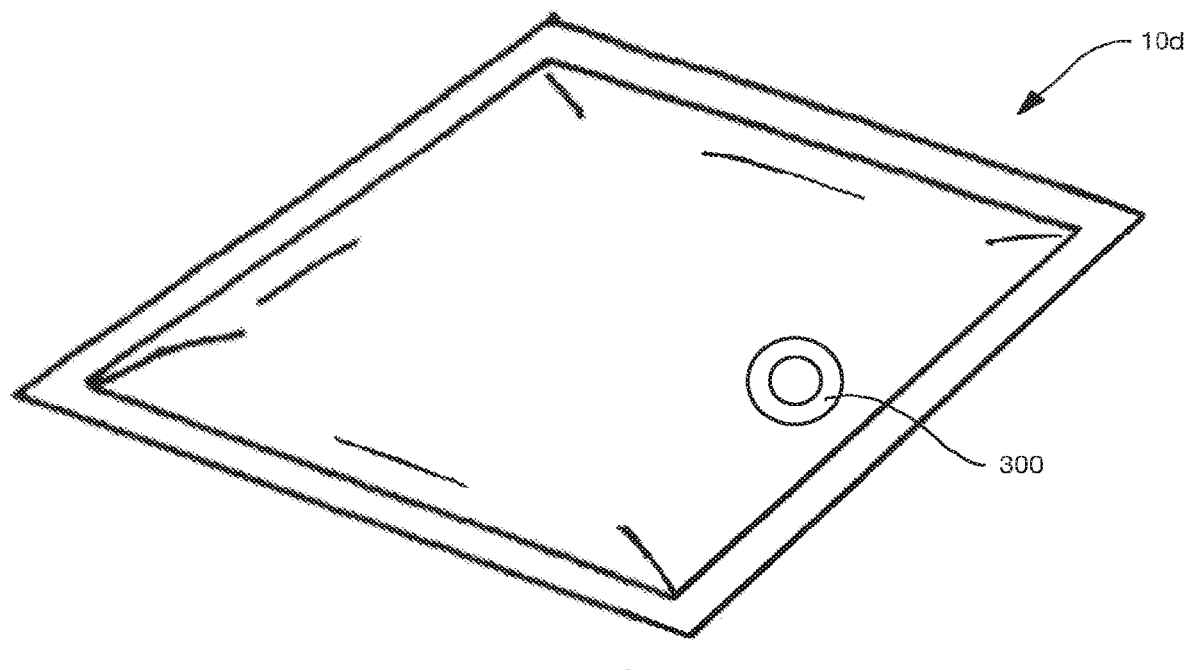
FIG. 8 depicts an upper perspective view of a fifth embodiment of the present ice packs with a port for closing the ice pack after water is added to its interior.

FIG. 8 depicts an upper perspective view of a fifth embodiment 10*d* of the present ice packs. Ice pack 10*d* is substantially similar to ice pack 10 with one primary difference; namely, that ice pack 10*d* comprises a port 300 coupled to body 14 and configured to permit the liquid to be introduced into the interior chamber. Port 300 can be threaded to receive a cap after the liquid has been introduced into the chamber, or can include a one-way valve, for example a flapper valve or a self-sealing membrane that is configured to automatically close the opening after water is received in the interior chamber. In this embodiment, because the opening is defined by and through only one of the two layers, second layer 58 can be bonded to first layer 54 around the entire perimeter of the interior chamber during manufacture such that closing the interior chamber does not require folding or otherwise bonding the first and second layers 54, 58 to each other.

Figure 9:
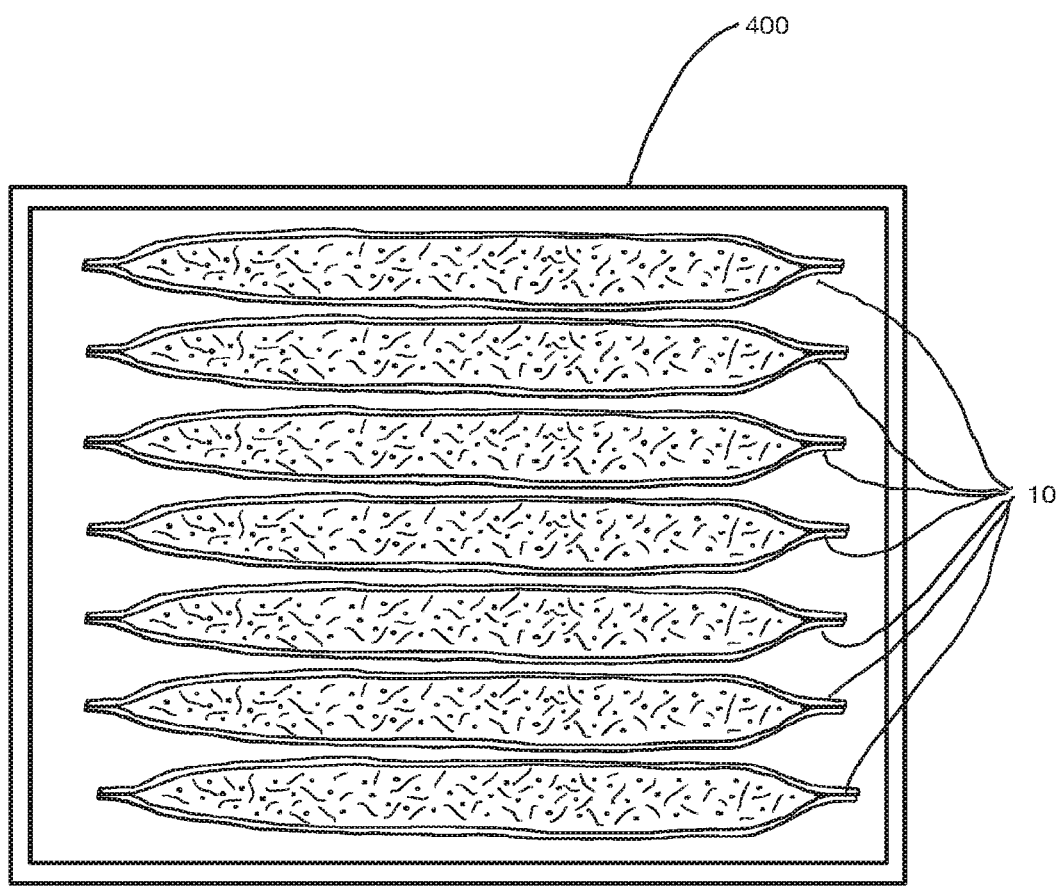
FIG. 9 depicts a top view of a container in which a plurality of the ice packs of FIG. 1 are disposed.

FIG. 9 depicts a top view of a container 400, for example a cardboard box, in which a plurality of ice packs 10 are disposed. In the embodiment shown, ice packs 10 are in a substantially dry state—i.e., water has not yet been deliberately introduced into their interior chambers. As noted above, the ability to ship the present ice packs in a dry state allows them to be shipped for significantly less expense than prior art ice packs that are shipped in a wet or hydrated state, at least because the water or other liquid in such prior art ice packs adds significant weight and/or bulk. As such, a container 400 of the present ice packs can be shipped from a first location at which the ice packs are manufactured or packaged for distribution to a second location, such as a cold storage warehouse where the ice packs can be hydrated and frozen. Such hydrated and frozen ice packs can then be disposed in other containers, for example similar to container 400, with one or more perishable items, such as food, or otherwise temperature-sensitive items, such as pharmaceuticals or biological samples, such that the frozen ice pack(s) can keep the temperature of such items lower than it would be in the absence of the ice pack(s).

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the methods and systems are not intended to be limited to the particular forms disclosed. Rather, they include all modifications and alternatives falling within the scope of the claims, and embodiments other than the one shown may include some or all of the features of the depicted embodiment. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

What is claimed is:

1. A method for producing an ice pack body, comprising:
   disposing distinct portions of absorbent material along a length of a first layer of paper; and
   bonding a second layer of paper to the first layer of paper such that the first and second layers define a plurality of interior chambers each including one or more of the distinct portions of the absorbent material;
   wherein each of the first and second layers of paper consists of one paper layer or a lamination of two or more paper layers and is configured to resist degradation when exposed to water and resist the passage of water, and
   wherein the absorbent material engages with a liquid-permeable substrate.

2. The method of claim 1, wherein the second layer is bonded to the first layer along longitudinal edges of the first and second layers.

3. The method of claim 2, where the second layer is bonded to the first layer along a plurality of lines extending laterally between the longitudinal edges and disposed between every other pair of the distinct portions of absorbent material such that each interior chamber includes two of the distinct portions of absorbent material.

4. The method of claim 3, further comprising:
   perforating the first and second layers along a plurality of lines extending laterally between the longitudinal edges and disposed between the two of the distinct portions of absorbent material in each of the interior chambers.

5. The method of claim 2, wherein the second layer is bonded to the first layer along a plurality of lines extending laterally between the longitudinal edges and disposed between each two distinct portions of absorbent material such that one of the distinct portions of absorbent material is disposed in each interior chamber.

6. The method of claim 1, wherein the absorbent material comprises super absorbent polymer (SAP) and cellulosic fibers.

7. The method of claim 6, wherein the SAP comprises 30 percent by weight or less of the absorbent material, and the cellulosic fibers comprise 70 percent or more by weight of the absorbent material.

8. The method of claim 1, wherein the first and second layers of paper include sizing that increases hydrophobic properties of the first and second layers of paper and/or increases resistance to passage of liquid through the first and second layers of paper.

9. The method of claim 1, wherein the first and second layers of paper have a dry tensile strength measured according to Test Standard ASTM D828-16 and a wet tensile strength measured according to Test Standard ASTM D829-97 that is 20% or more of the dry tensile strength.

10. The method of claim 1, wherein the absorbent material is coupled to the liquid-permeable substrate.

11. The method of claim 1, wherein each of the plurality of interior chambers is configured to receive liquid.

12. The method of claim 11, wherein the absorbent material is configured to absorb at least some of the liquid.

13. The method of claim 12, wherein the liquid is disposed in the absorbent material, and the liquid is frozen.

14. The method of claim 1, wherein the absorbent material is encapsulated within the liquid-permeable substrate.

15. The method of claim 1, wherein the liquid-permeable substrate comprises tissue.

16. The method of claim 1, wherein the first and second paper are configured to resist the passage of water for about 5-300 minutes or more.

17. The method of claim 1, wherein the first and second paper each have a basis weight of about 20-80 gsm or more.

18. The method of claim 1, wherein each of the first and second layers of paper consists of a single paper layer.

19. The method of claim 1, wherein each of the first and second layer of paper consists of a lamination of two or more paper layers.

* * * * *